United States Patent [19]

Johnson

[11] Patent Number: 4,593,603

[45] Date of Patent: Jun. 10, 1986

[54] ASYMMETRICALLY ACCELERATED VIBRATOR FOR FEEDING MATERIALS

[76] Inventor: Leroy A. Johnson, 105 Warren Glen Rd., Bloomsbury, N.J. 08804

[21] Appl. No.: 628,769

[22] Filed: Jul. 9, 1984

[51] Int. Cl.[4] ....................... F01L 15/14; B65G 27/22; F01B 7/18; F15B 13/04

[52] U.S. Cl. ........................................ 91/265; 91/321; 91/398; 91/417 R; 91/471; 198/768; 209/920

[58] Field of Search ................. 91/183, 405, 409, 410, 91/415, 417 R, 471, 265, 321, 325, 398, 235, 408; 209/695, 920; 198/768

[56] References Cited

U.S. PATENT DOCUMENTS

| | | | |
|---|---|---|---|
| 638,489 | 12/1899 | Albree | 91/417 R X |
| 860,660 | 7/1907 | Heldmaier | 91/265 X |
| 2,590,155 | 3/1952 | Cannon | 91/471 X |
| 2,837,896 | 6/1958 | Cox | 91/183 |
| 2,861,548 | 11/1958 | Burgess, Jr. et al. | 91/409 X |
| 2,969,044 | 1/1961 | Leduc | 91/417 R X |
| 3,274,899 | 9/1966 | Stump | 91/265 |
| 3,628,419 | 12/1971 | Doughton | 91/321 X |
| 4,448,262 | 5/1984 | Vincent | 91/325 X |

FOREIGN PATENT DOCUMENTS

| | | | |
|---|---|---|---|
| 1239948 | 5/1967 | Fed. Rep. of Germany | 91/405 |
| 264090 | 6/1970 | U.S.S.R. | 91/417 R |

*Primary Examiner*—Robert E. Garrett
*Assistant Examiner*—George Kapsalas
*Attorney, Agent, or Firm*—Horst M. Kasper

[57] ABSTRACT

An asymmetrical vibrator is provided, which is actuated by compressed air. The vibrator operates in a case, which has two bores disposed parallel on opposite sides of the casing. One of the bores is smaller than the second bore and the piston operating in the small bore is called the slow piston, since it is actuated with air to a relatively slow motion and the piston operating in the second larger bore is called the fast piston, since it is moves at a larger speed when driven directly by the compressed air. The asymmetric vibration motion can be employed to transport materials upwardly in factories and assembly stations. The air operated asymmetric vibrators need low maintenance and do not entail the spark dangers caused by the presence of electrical wiring for electrical drive motors.

18 Claims, 6 Drawing Figures

ASYMMETRICALLY ACCELERATED VIBRATOR FOR FEEDING MATERIALS

FIELD OF THE INVENTION

The present invention provides an asymmetrically accelerated vibrator for feeding materials which uses pistons activated by compressed air.

BRIEF DESCRIPTION OF THE BACKGROUND OF THE INVENTION INCLUDING PRIOR ART

Most air operated tools of conventional construction have used springs to hold position or activate valves. This results in the disadvantage that these springs either wear or break and require frequent service of such equipment.

Conventional air tools include impact tools such as hammers and other devices to provide reciprocal motion. Such reciprocal motions are frequently such that the forward and the backward motion are more or less symmetrical. It has been desirable to have units where the forward and the backward motion are different such that the difference between the friction of initiation and the sliding friction can be used to move materials depending on the cycle of the strokes. Furthermore, air driven tools in most cases contained springs, which present a service problem since they are subject to wear and breakage.

SUMMARY OF THE PRESENT INVENTION

1. Purposes of the Invention

It is the object of the present invention to provide an asymmetrically accelerated vibrator using air operated pistons to feed materials.

It is another object of the present invention to provide an air operated vibrator which does not use springs since springs are subject to wear and breakage and require frequent servicing of the equipment.

These and other objects and advantages of the present invention will become evident from the description which follows.

2. Brief description of the Invention

The present invention provides an asymmetrically accelerated vibrator for feeding materials which comprises a compressed air feed at a casing, a first piston having a relatively small diameter and disposed in a first chamber of the casing, an air feed connecting the feed line to the chamber of the first piston, a second larger diameter piston disposed in a second recess of the casing and running in a direction parallel to the first piston, a mechanical connection between the first and second piston such that those pistons move uniformly, a support bar attached to the face of the second piston directed into the second recess, a valve member disposed in front of the second piston inside of the second recess and adapted to be pulled outward by the bar in case the second piston moves outward and adapted to be pushed inward by the head of the second piston, an air feed connected to the feed line to the inside area in front of the second piston and closable by the valve member in case the piston moves outwardly, which feed line opens when the head of the second piston presses against the valve member, and an exhaust line for the second recess.

Graduated air feeds can connect the feed line to the recess of the first piston such that the amount of air streaming from the feed line to the piston area is initially smaller and increases with outward motion of the first piston. A valve can be associated with the air feed connecting the feed line to the recess of the first piston for allowing an increased discharge flow from the first recess when the first piston moves into the recess. The exhaust line for the second recess can be disposed further inward into the recess relative to the feed line input for the compressed air. A springing and damping piece can be disposed between the second piston and the valve member disposed in front of the second piston for cushioning the force engagements between the support bar and the valve. The valve member disposed in front of the second piston can have openings such that the compressed air can fill the recess ahead of the second piston. An air inlet valve can be furnished for the air intake of the second recess wherein the valve disposed in front of the second piston is a valve actuator, which can open the air inlet valve when the valve moves deep into the recess. A bevel can be provided at the front cylinder of the valve member disposed in front of the second piston to allow engagement of a pin of the air inlet valve when the valve member moves into the piston, and a smaller diameter section of the valve member following the bevel to retain the air inlet valve in an open position while the valve is deep in the second recess. A small diameter bore in the casing can provide the vent for the exhaust air. A control piston can slide in the small diameter bore for controlling the exhaust air opening of the second recess. An exhaust air path can run from the second recess to a longitudinal slot in the wall of the small diameter bore disposed about the area of the end of the piston for allowing the air exhaust path to become larger as the second piston moves further into the second recess. The casing can be made of aluminum. The first piston and the second piston can be sealed against the respective recess wall with an O-ring.

There is also provided a method for converting compressed air power into an asymmetrically accelerated vibration for feeding materials which comprises feeding compressed air to an intake at a casing, disposing a first piston having a relatively small diameter in a first recess of the casing, connecting an air feed line to the recess of the first piston, attaching a support bar to the face of a second piston to be directed into a second recess of the casing, placing a valve member in front of the second piston inside of the second recess, disposing the second larger diameter piston in the second recess of the casing and running in a direction parallel to the first piston, mounting a mechanical connection between the first and second piston such that those pistons move uniformly, connecting an air feed line to the inside area in front of the second piston which air feed line is closable by the valve in case the piston moves outwardly, which feed line opens when the head of the second piston presses against the valve member, and providing an exhaust line for the second recess.

The valve for compressed air input into the second recess can be opened. The second piston can move rapidly outward. The valve for the compressed air input into the second recess can be closed. Some compressed air can be allowed to enter the area in front of the first piston to reverse the direction of motion and to move the first piston slowly in outward position. The cycle can be continued upon a completed outward motion of the first piston by opening the valve again for the compressed air input into the second recess. The valve member can be adapted to be pulled outward by the bar in case the second piston moves outward and can be adapted to be pushed inward by the head of the second piston.

The invention also provides a method, which comprises opening a valve to allow compressed air to pass into the area of a second recess in front of a second piston, rapidly moving the second piston outwardly and a smaller diameter first piston inwardly, which smaller diameter piston is mechanically linked to the second piston to move in parallel in the same direction, closing the valve passing compressed air into the second recess upon reaching of a limiting point of the inward motion of the first piston, opening initially slowly an exhaust line to release the compressed air in front of the second piston, driving the first piston outwardly at a smaller speed by feeding compressed air into the first recess, and continuing the cycle by opening the valve to allow again for the entry of compressed air into the area in front of the second piston.

The amount of compressed air streaming from the compressed air intake into the area in front of the first piston can be gradually increased. The discharge flow from the first recess can be increased by providing a valve in an air intake disposed closely to the bottom of the first recess. The exhaust flow from the second recess can be increased with the progressing inward motion of the second piston.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
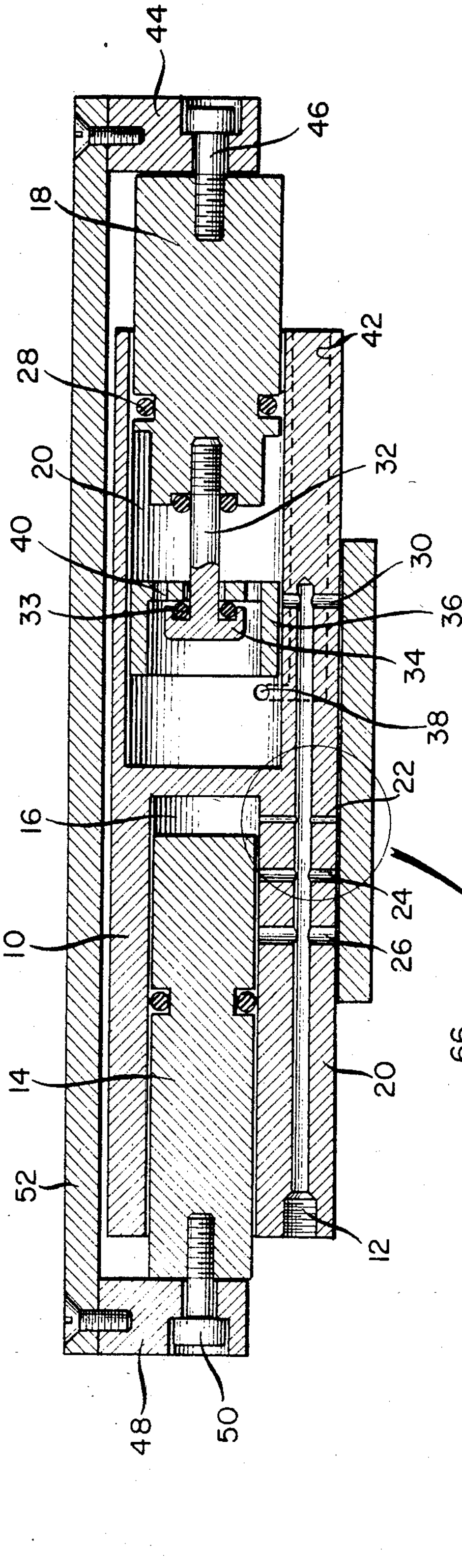
FIG. 1 is a sectional elevational view of an asymmetrically accelerated vibrator for feeding materials.

Referring to FIG. 1, there is shown a case 10 to hold various recesses and lines for the flow of compressed air and for the motion of two pistons. The case is preferably made from a material which is stable and allows the motion of pistons. Materials which are suitable include such materials generally used for the construction of automobile engines. In particular cast iron is a preferred material. Materials which can also be suitable include aluminum and plastic. A connection 12 is provided to feed compressed air into the various compartments of this device. The block comprises two recesses adapted for two pistons, where the pistons run in a parallel direction. The first piston 14 runs in relatively smaller diameter bore of the bore 16 of the casing. The second piston 18 runs in a somewhat larger diameter bore of the bore 20 in the casing. The first piston comprises a groove for an o-ring surrounding the periphery of the piston in order to provide a seal against leakage of air. Several feeds for compressed air are connected from the air line to the first bore 16. FIG. 1. shows three such feeds 22, 24 and 26. The diameter of the feed 22 is smaller than that of feed 24 and that again is smaller than the diameter of feed 26. The feed 22 is disposed relatively close to the bottom of the bore 16. Preferably the feeds are spaced about equidistantly. The diameter of the first feed 22 can be about 0.5 to 2 millimeters and is preferably around 1 millimeter. The diameter of the second feed 24 can be from about 1 to 2 millimeters and is preferably around 1.6 millimeters and the diameter of the third feed 26 can be from about 2 to 4 millimeters and preferably is around 3.2 millimeters. This arrangement of the feeds ensures that the piston accelerates when it moves further out.

There is also provided a second piston 18 which has a larger diameter than the first piston 14 and this piston moves in a bore 20 of the case. An o-ring 28 is provided to seal the volume in the bore to press against the second piston. The second piston is provided with a bar 32 attached to its front base extending further into the bore. Due to the protruding bar 32 and the construction of the piston 18, the feed line 30 connecting the bore hole with the compressed air feed 12 remains always outside of the region which is covered by the motion of the second piston. This can be achieved for example by having the center part of the piston 18 protrude further into the bore hole as compared to the outer ring of the piston cylinder. The bar 32 is provided with a head 34 valve 36 which is disposed around the bar 32 and can slide along that bar. The purpose of the valve 36 is to open the feed opening 30 and close the discharge opening 38 and vice versa. Feed throughs 40 are provided such that the volume in the bore 20 on the two sides of the valve 36 is communicating through the valve 36. The valve 36 is constructed such that one of the feed line 30 or the discharge 38 is closed or open and when one is open the other one is closed. The feed line 30 is of a relatively large diameter. The discharge line 38 is fed to an exhaust 42.

The second piston 18 is attached to a holder 44 with a screw 46. The first piston 14 is attached to a holder 48 with a screw 50. The two holders in turn are connected by a plate 52 which is screwed to the first holder 44 and the second holder 48. This construction ensures uniform movement, that is, any motion of the first piston is paralleled by virtually exactly the same motion of the second piston.

Figure 2:
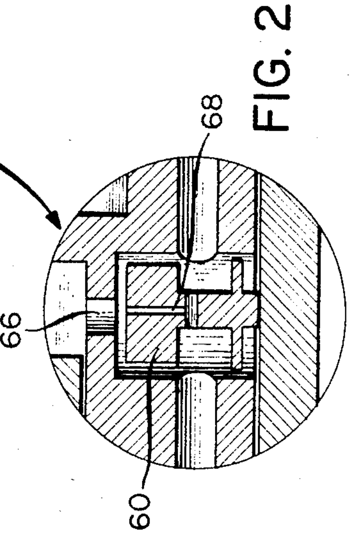
FIG. 2 is a sectional view of an example of a valve which can be employed instead of a multiple opening on the multiple air feed to modify the embodiment of the invention shown in FIG. 1.

The construction of the multiple air feed of the first bore 16 can be modified by employing a valve instead of a multiple opening. As an example for such a construction FIG. 2 shows a small valve which provides different flow speed in different directions. When the full air pressure attempts to enter into the second bore, the valve 60 is moved into the bore 62 and substantially closes the opening 66. The air flow in this situation is limited by the small diameter of the bore 68. In this situation the first piston is moved outward such that the air volume in the bore 16 increases. In the case of the opposite stroke the air pressure in the volume 16 in the first bore is larger and this presses the valve 60 away from the opening 66 and allows a faster passage of air in this situation.

The mode of operation of the asymmetric accelerated vibrator for material transport is as follows: The second piston is larger than the first piston. The inlet opening of the second piston is of such dimension as to move the second piston very rapidly upon opening of the passage 30. At the end of the outward stroke of the second piston the opening 30 becomes shut, the air is cut off and the exhaust port 38 is opened. Since the second bore has a larger volume of air and a smaller size discharge port this induces the piston to come momentarily to a stop or to hesitate.

Once enough air has discharged through the discharge 38 then the air pressure exerted on the first piston takes over and direction of motion reverses. The first piston starts to move slowly at first due to the construction of the air feed in and then picks up speed as the second and third feed lines are opened. This cycle continues until the second piston pushes against the valve 36 and moves the valve inwardly such that the port 30 opens and the discharge valve 38 closes. At this moment the larger pressure forming in the second bore causes the vibrator to stop and to reverse its motion, since the force exerted on the larger piston 18 is larger compared to the force exerted on the smaller diameter piston 14.

The combination of the larger piston 18 with the valve 36 leads to reciprocal motion of the two pistons. The return of the reciprocal motion in the case where the large feed 30 opens is very fast due to the large bore diameter of the feed 30. The reversal of the motion in the case where the smaller volume is completely filled with air is much slower, since the discharge opening 38 is relatively small and the volume filled with compressed air relatively large such that the large volume of compressed air ahead of the second piston 18 opposes the backward motion of the second piston 18, which is fed with compressed air initially only by the small line 22.

The combination of this asymmetrically accelerated vibrator with a transport chute or transport surface results in transport of materials in one direction. The fast motion of the second piston 18 due to the large opening to feed in air combined with the hesitation, that is, a low acceleration of the pistons for a certain time, results in a transport of materials such as for example screws. The fast motion accelerates the material to a relatively fast speed and the hesitation or stoppage of the piston results in a sliding continuation motion of the particles which results in a shift of the location of the material relative to the location of the support attached to the plate 52. In the case where the small piston 14 moves outward and its bore fills, there initially occurs a relatively slow motion based on the hesitation which slowly picks up to some extent and is then again reversed by the opening of the large bore feed 39 when the valve is pushed far enough in by the second piston so that the air can stream in.

This asymmetric accelerated vibrator can be used attached to transport sheets for transporting material such as screws. The fast motion of the second piston followed by the hesitation results in a continuation of the motion of the material on the sheet during the hesitation time. Then the sheet runs in the opposite direction taking the materials with it. Nothing happens relative to the location of the material on the sheet during this cycle. After the return motion is ended another forward motion results associated with imparting a fast speed to the material followed by another time of hesitation during which the material moves another distance.

This asymmetric accelerated vibrator allows removal of parts and material from areas which are inaccessible or inconvenient to reach by other means such as under a machine or a punch press. In addition this asymmetric accelerated vibrator does not require any electrical connections since it is operated by compressed air. This allows application of this vibrator in areas where electrical currents and voltages are to be avoided. If such a tray is attached to one vibrator this can be followed by more trays and can result in an upward motion of the material placed on the trays. When enough air has discharged from the second bore the return side takes over since the small port at front of this first piston starts to move slowly at first and picks up speed as the second and third port are opened.

On large units a small valve as shown in FIG. 2 can be installed in the first port on the return side of the first bore. This valve allows the air to return faster during the time of a forward stroke. A small port in the valve controls the flows of the incoming air once the return stroke is under way.

Figure 3:
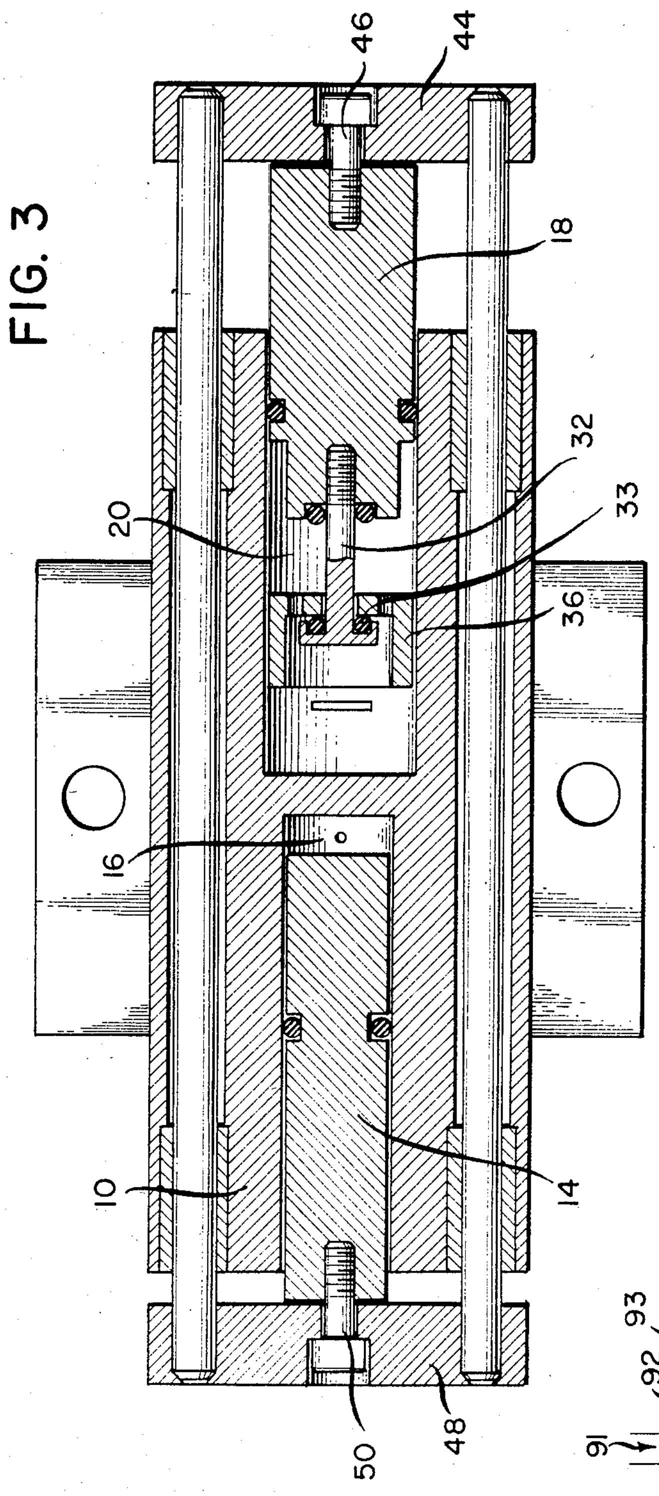
FIG. 3 is planar view of the embodiment of FIG. 1.
Figure 4:
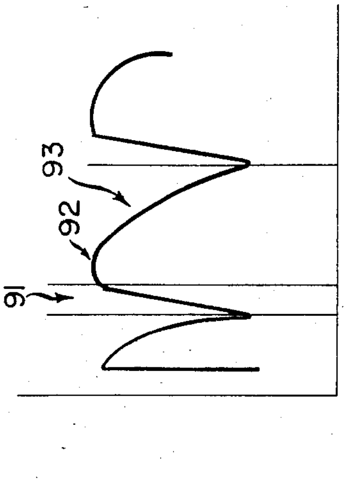
FIG. 4 is a time location diagram of the motion of the asymmetric vibrator.

The numerals shown in FIG. 3 designate the same items as indicated for FIG. 1. FIG. 4 shows a time-position diagram of the vibrator. The time is plotted on the abscissa and the location is plotted on the ordinate. It can be recognized that the speed is much larger in a first direction 91, where the large piston is directly driven by the compressed air, and smaller in the other direction 93. At 92 one can recognize that the velocity increases slowly like a parabola and this indicates that the acceleration is about constant and no initial jerk occurs, which would cause a sliding of material disposed on the vibrator. The large acceleration occuring at the other point of reversal is such that most materials start to slide as the acceleration is larger than the static friction. Once the static friction is overcome, the materials continue to slide since in most cases the dynamic friction is lower than the static friction. Therefore, many materials will slide on a vibrator support of the invention during the fast stroke 91 and they will be carried with the slow stroke 93, since the acceleration based on the hesitation is not large enough to overcome the static friction. The average speed for the fast motion can be about 3 to 5 times the average speed of the slow motion cycle.

Figure 5:
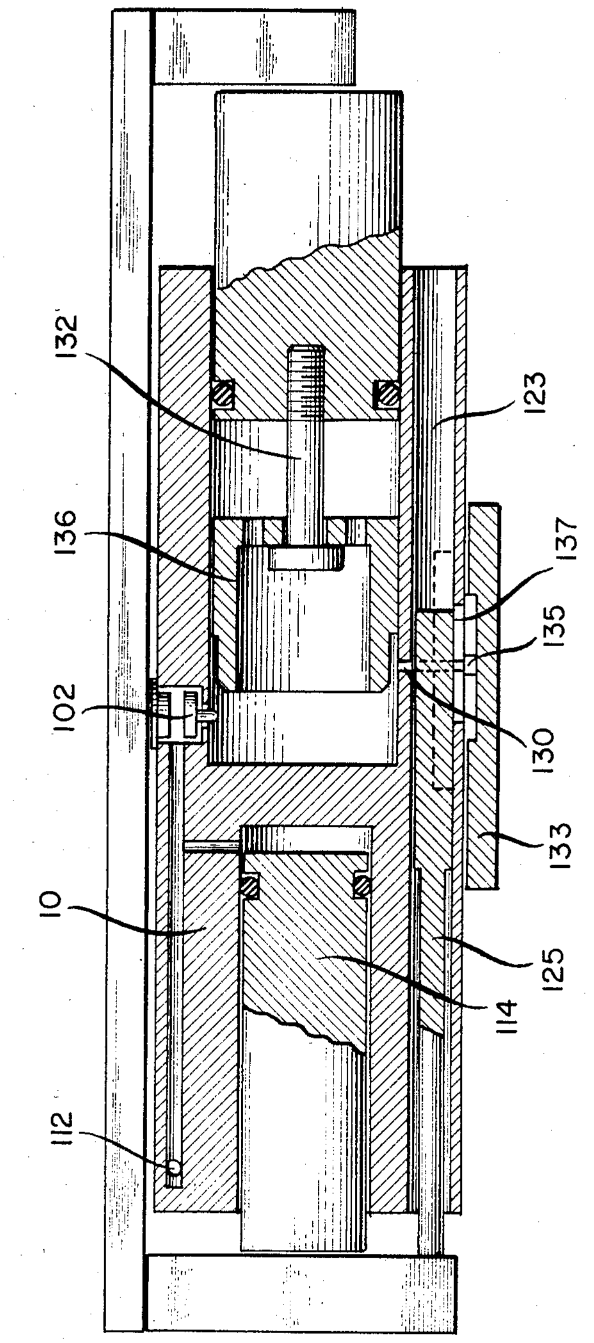
FIG. 5 is an elevational sectional view of a second embodiment.

FIG. 5 is a view of a preferred embodiment. Here the air intake of the large diameter recess chamber is controlled by a valve 102 connected to a line running to the air intake port 112. The valve 102 opens if the valve member 136 is pushed deeper into the recess chamber by the compressed air. The outer cylinder of the valve member has a bevel in the outer front in order to properly engage the valve 102, and the bevel is followed by a cylindrical section with a diameter smaller than the inner diameter of the recess chamber to allow the valve 102 to be kept in open position. The exhaust is provided via an opening 130 in the wall of the recess chamber, which is then led around downwardly into a slot 135 in the foot support of the vibrator. A slot elongated in the direction of vibration motion runs on the outside of a bore 123, wherein a piston 125 attached to the vibrating parts moves for control of the exhaust air flow. The further piston 125 is to a limit position of the direct motion of the first piston, the lower is the flow resistance encountered by the exhaust air coming from the larger diameter recess chamber. The more precise control of the flow pattern of the compressed air into and from the layer recess eliminates substantially the need to specifically control the flow pattern into the smaller recess. The bar 132 can also be provided at its end with elastic springing damping members corresponding to the elastic springing damping members 33 of the embodiment of FIG. 1 in order to cushion the impact. Items shown in FIG. 6 correspond in general to those of FIG. 1 and only some of the changes have been newly numbered.

Figure 6:
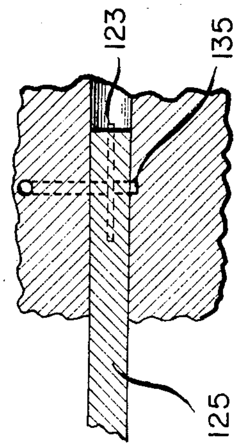
FIG. 6 is a detail view of the air exhaust of the embodiment of FIG. 5.

FIG. 6 illustrates the exhaust line from the larger diameter recess chamber. The opening 130 is connected via a line to a slot 135 in the foot 133 of the vibrator. This slot communicates with a longitudinal slot in the wall of a bore 123 and the flow path resistance for the exhaust air is controlled by the position of the small piston 125. The slot 137 can have a width of from about 0.2 to 0.5 millimeter and was milled to 0.015 inch in parallel with the exhaust tube with the small piston 125 controlling the flow. The position of the piston end is adjusted to allow initially only a very small amount of air to discharge. At this time the reversing acceleration of the vibrating parts is low, that is hesitation occurs. As the small piston 125 moves back out of the bore it uncovers most of the slot opening and allows the air to exhaust faster and an increase in speed of the vibrating parts. The low acceleration and gradual increase in speed are needed to keep for example material moving together with a tray.

It is a particular advantage of this construction that the tool does not use any springs in the ports for holding or activating certain valves. The absence of springs increases the lifetime and reduces the service requirements of such a tool. Using the other side of valve to trap the air in the bottom of the bore acts to provide a cushion at the end of each stroke of the second piston.

Preferably the asymmetrically accelerated vibrator runs at about 300 to 550 strokes per minute. The intake opening can be made larger if more speed is desired but this requires more air volume. A further advantage of this construction is that only one level of pressure or compressed air is required. The guidance of the piston must be fairly perfect and it should be with a tolerance of about 120 microns. Bearings are provided from teflon. In the case of larger units ball bearing can be used.

The relative diameter of the smaller piston to the larger piston can be from about 1 to 1.25 to about 1 to 2. The intake port can be from about 2 to 5 millimeters and is preferably about 3.6 millimeters. The discharge opening can be from about 2 to 5 millimeters and is preferably about 3.2 millimeters. It is preferred to have the discharge opening of the second bore of slightly less diameter than the intake opening of the same bore.

It will be understood that each of the elements described above, or two or more together, may also find a useful application in other types of procedures differing from the types described above.

While the invention has been illustrated and described as embodied in the context of an asymmetrically accelerated vibrator for feeding materials, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An asymmetrically accelerated vibrator for feeding materials comprising:

a casing;

a compressed air feed at the casing;

a first piston having a relatively small diameter and disposed in a first chamber of the casing;

an air feed connecting the feed line to the chamber of the first piston;

a second larger diameter piston disposed in a second recess of the casing and running in a direction parallel to the first piston;

a mechanical connection between the first and second piston such that those pistons move uniformly;

a support bar attached to the face of the second piston directed into the second recess;

a valve member disposed in front of the second piston disposed completely inside of the second recess and adapted to be pulled outward relative to an inner end wall of the second recess by the bar in case the second piston moves outward relative to the inner end wall of the second recess and adapted to be pushed inward relative to the inner end wall of the second recess by the head of the second piston;

an air feed connected to the feed line and to the inside area in front of the second piston which air feed is closable by the valve member in case the piston moves outwardly relative to the inner end wall of the second recess, which air feed opens when the head of the second piston presses against the valve member; and an exhaust line for the second recess.

2. The asymmetrically accelerated vibrator for feeding materials according to claim 1 further comprising graduated air feeds connecting the feed line to the recess of the first piston such that the amount of air streaming from the feed line to the piston area is initially smaller and increases with outward motion of the first piston.

3. The asymmetrically accelerated vibrator for feeding materials according to claim 1 further comprising a valve associated with the air feed connecting the feed line to the recess of the first piston for allowing an increased discharge flow from the first recess when the first piston moves into the recess.

4. The asymmetrically accelerated vibrator for feeding materials according to claim 1 wherein the exhaust line for the second recess is disposed further inward into the recess relative to the feed line input for the compressed air.

5. The asymmetrically accelerated vibrator for feeding materials according to claim 1 further comprising a springing and damping piece disposed between the second piston and the valve member disposed in front of the second piston for cushioning the force engagements between the support bar and the valve.

6. The asymmetrically accelerated vibrator for feeding materials according to claim 1 wherein the valve member disposed in front of the second piston has openings such that the compressed air can fill the recess ahead of the second piston.

7. The asymmetrically accelerated vibrator for feeding materials according to claim 1 further comprising an air inlet valve for the air intake of the second recess wherein the valve member disposed in front of the second piston is a valve actuator, which can open the air inlet valve when the valve member moves deep into the recess.

8. The asymmetrically accelerated vibrator for feeding materials according to claim 7 further comprising
- a bevel at the front cylinder of the valve member disposed in front of the second piston to allow engagement of a pin of the air inlet valve when the valve moves into the piston; and
- a smaller diameter section of the valve member following the bevel to retain the air inlet valve in an open position while the valve is deep in the second recess.

9. The asymmetrically accelerated vibrator for feeding materials according to claim 7 further comprising
- a small diameter bore in the casing providing the vent for the exhaust air; and
- a control piston sliding in the small diameter bore for controlling the exhaust air opening of the second recess.

10. The asymmetrically accelerated vibrator for feeding materials according to claim 9 further comprising an exhaust air path from the second recess to a longitudinal slot in the wall of the small diameter bore disposed about the area of the end of the piston for allowing the air exhaust path to become larger as the second piston moves further into the second recess.

11. The asymmetrically accelerated vibrator for feeding materials according to claim 1 wherein the casing is made of aluminum.

12. The asymmetrically accelerated vibrator for feeding materials according to claim 1 wherein the first piston and the second piston are sealed against the respective recess wall with an O-ring.

13. A method for converting compressed air power into an asymmetrically accelerated vibration for feeding materials comprising:
- feeding compressed air to an intake at a casing;
- disposing a first piston having a relatively small diameter in a first recess of the casing;
- connecting an air feed line to the recess of the first piston;
- attaching a support bar to the face of a second piston to be directed into a second recess of the casing;
- placing a valve member in front of the second piston inside of the second recess;
- disposing the second larger diameter piston in the second recess of the casing and running in a direction parallel to the first piston;
- mounting a mechanical connection between the first and second piston such that those pistons move uniformly;
- connecting an air feed line to the inside area in front of the second piston which air feed line is closable by the valve in case the piston moves outwardly relative to the inner end wall of the second recess, which feed line opens when the head of the second piston presses against the valve member; and
- providing an exhaust line for the second recess.

14. The method for converting compressed air power into an asymmetrically accelerated vibration according to claim 13 further comprising:
- opening the valve for compressed air input into the second recess;
- moving the second piston rapidly outward; closing the valve for the compressed air input into the second recess;
- allowing some compressed air to enter the area in front of the first piston to reverse the direction of motion and to move the first piston slowly in outward position relative to an inner end wall of the first recess; and
- continuing the cycle upon a completed outward motion of the first piston by opening the valve again for the compressed air input into the second recess.

15. A method for converting compressed air power into an asymmetrically accelerated vibration comprising
- opening a valve to allow compressed air to pass into the area of a second recess in front of a second piston;
- rapidly moving the larger in diameter second piston outwardly relative to an inner end wall of the second recess and a smaller diameter first piston inwardly relative to an inner end wall of the first recess, which smaller diameter piston is mechanically linked to the second piston to move in parallel in the same direction;
- closing the valve passing compressed air into the second recess upon reaching of a limiting point of the inward motion of the first piston;
- opening initially slowly an exhaust line to release the compressed air in front of the second piston;
- driving the first piston outwardly relative to an inner end wall of the first recess at a smaller speed by feeding compressed air into the first recess;
- continuing the cycle by opening the valve to allow again for the entry of compressed air into the area in front of the second piston;
- pulling a valve member outward with a bar attached to the second piston when the second piston moves outward, and pushing the valve member inward at the head of the second piston when the second piston moves inward relative to the inner wall of the second recess, the valve member thus covering an opening in the side wall of the second recess.

16. A method for converting compressed air power into an asymmetrically accelerated vibration according to claim 15 further comprising:
- gradually increasing the amount of compressed air streaming from the compressed air intake into the area in front of the first piston.

17. A method for converting compressed air power into an asymmetrically accelerated vibration according to claim 15 further comprising:
- increasing the discharge flow from the first recess by providing a valve in an air intake disposed closely to the bottom of the first recess.

18. A method for converting compressed air power into an asymmetrically accelerated vibration according to claim 15 further comprising:
- increasing the exhaust flow from the second recess with the progressing inward motion of the second piston.

* * * * *